US011391652B2

(12) United States Patent
Cubizolles et al.

(10) Patent No.: US 11,391,652 B2
(45) Date of Patent: Jul. 19, 2022

(54) DEVICE FOR PREPARING A CALIBRATED VOLUME OF BLOOD PLASMA

(71) Applicant: Commissariat A L'Energie Atomique et aux Energies Alternatives, Paris (FR)

(72) Inventors: Myriam-Laure Cubizolles, Grenoble (FR); Manuel Alessio, Grenoble (FR); Remco Den Dulk, Grenoble (FR); Frederic Revol-Cavalier, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 251 days.

(21) Appl. No.: 16/683,471

(22) Filed: Nov. 14, 2019

(65) Prior Publication Data

US 2020/0158604 A1    May 21, 2020

(30) Foreign Application Priority Data

Nov. 16, 2018   (FR) ..................................... 18 60597

(51) Int. Cl.
*G01N 1/28* (2006.01)
*B01L 3/00* (2006.01)

(52) U.S. Cl.
CPC .......... *G01N 1/28* (2013.01); *B01L 3/502738* (2013.01); *B01L 2300/087* (2013.01);
(Continued)

(58) Field of Classification Search
CPC .............. G01N 1/28; G01N 2001/2893; B01L 3/502738; B01L 3/5027; B01L 3/502;
(Continued)

(56) References Cited

U.S. PATENT DOCUMENTS

| 5,837,203 A | 11/1998 | Godec et al. |
| 5,976,468 A | 11/1999 | Godec et al. |

(Continued)

FOREIGN PATENT DOCUMENTS

| CN | 105879936 A | 8/2016 |
| EP | 2 492 682 A1 | 8/2012 |

OTHER PUBLICATIONS

French Preliminary Search Report dated Jul. 8, 2019 in French Application 18 60597 filed on Nov. 16, 2018 (with English Translation of Categories of Cited Documents & Written Opinion).

*Primary Examiner* — Christine T Mui
(74) *Attorney, Agent, or Firm* — Oblon, McClelland, Maier & Neustadt, L.L.P.

(57) ABSTRACT

A system for preparing a calibrated volume of blood plasma that includes a plurality of parts: a device for preparing the calibrated volume of blood plasma, which is in the form of a single card; a pneumatic-type actuating system SP; a treatment and command unit UC configured such as to execute a command sequence of different pneumatic command points of the pneumatic actuation system with a view to obtaining, from a taken blood sample, the calibrated volume of blood plasma. The device includes three distinct modules: a fluidic connection module M1 onto which a blood sampling device may be connected; a module M2 for separation of the blood plasma contained in the blood sample; a module M3 for obtaining at least one calibrated volume of blood plasma, after separation.

16 Claims, 6 Drawing Sheets

(52) U.S. Cl.
CPC .............. *B01L 2300/0816* (2013.01); *B01L 2400/0487* (2013.01); *B01L 2400/06* (2013.01); *G01N 2001/2893* (2013.01)

(58) Field of Classification Search
CPC .............. B01L 3/50; B01L 2300/0816; B01L 2300/087; B01L 2400/0487; B01L 2400/06
USPC ..................................... 422/503, 500, 50
See application file for complete search history.

(56) References Cited

U.S. PATENT DOCUMENTS

| | | | |
|---|---|---|---|
| 6,271,043 | B1 | 8/2001 | Godec et al. |
| 8,349,277 | B2 * | 1/2013 | Azimi ............... F16K 99/0036 422/507 |
| 9,670,528 | B2 * | 6/2017 | Handique ............. B33Y 40/00 |
| 2002/0019058 | A1 | 2/2002 | Godec et al. |
| 2003/0138970 | A1 | 7/2003 | Godec et al. |
| 2008/0031775 | A1 | 2/2008 | Godec et al. |
| 2012/0220047 | A1 | 8/2012 | Seifried et al. |
| 2014/0227710 | A1 * | 8/2014 | Handique ............... F04B 19/24 435/6.12 |
| 2018/0200677 | A1 | 7/2018 | Lee et al. |
| 2018/0275058 | A1 | 9/2018 | Stern et al. |

* cited by examiner

DEVICE FOR PREPARING A CALIBRATED VOLUME OF BLOOD PLASMA

TECHNICAL FIELD OF THE INVENTION

The present invention relates to a device for preparing a calibrated volume of blood plasma. The invention also relates to a system for preparing a calibrated volume of blood plasma and to a command method implemented such as to obtain a sample of calibrated volume of blood plasma from a blood sample in a sampling device connected to the preparation device of the system.

PRIOR ART

Many medical analyses are performed using blood plasma rather than whole blood (for example: measurement of hormone, protein, glucose, lipid, etc. levels). To carry out such analyses, it is thus necessary to separate out the blood plasma in a blood sample.

Centrifugation is the most commonly used technique for extracting blood plasma. Centrifugation between 1000 g and 3000 g for a duration of 5 min to 15 min makes it possible to separate out the blood components on the basis of density and to recover the supernatant plasma from anti-coagulated blood.

This technique requires a centrifuge, which is regularly the case in a medical environment, but is problematic when out in the operational field.

For in-field applications, techniques for separating out blood plasma without centrifugation exist. They are based on a principle of filtration, on a principle of blood cell depletion by sedimentation, on a principle of red blood cell agglutination or, alternatively, on a combination of these various methods. The filters used to separate out the plasma are generally composed of a porosity gradient that makes it possible to retain the blood cells in the thickness of the filter as a function of their size. This gradient allows the passage of the plasma and limits clogging of the filter.

Furthermore, it is known that determination of the concentrations of the components to be measured in blood requires a knowledge of the volume of plasma on which the analysis is performed. To that end, the analysis volume thus has to be known and hence calibrated. In an analytical laboratory, after centrifugation of the blood, a calibrated sample of plasma may easily be taken (using a pipette or analytical robot). However, in a "lab-on-a-chip" device, which is used in the field, the generation of a calibrated volume of blood plasma may turn out to be more complicated, particularly if it is desired to recover the calibrated volume in liquid rather than solid form.

Devices that use separation membranes combined with a plasma calibration solution have already been described in the prior art.

U.S. Pat. No. 5,169,789A describes a device that combines a separation membrane placed above a cavity containing the sampled blood. Initially, sedimentation of the blood cells gives rise to an increase in the concentration of the blood cells in the cavity and a depletion of these blood cells overhead, in the vicinity of the separation membrane. The cover of the device carries the separation membrane and has an opening for the insertion of a pipette. The pipette makes it possible to generate a sufficient drop in pressure to aspirate the plasma through the membrane. The characteristics of the pipette thus play a role in the amount of plasma collected. Yet this device does not propose a solution for controlling the air bubbles contained in the separation membrane, these air bubbles modifying the volume of plasma recovered in the pipette.

Patent application US 2014/0263059A1, meanwhile, describes a microfluidic system for separating out plasma by means of filtration, using the principle of red blood cell agglutination. The membrane employed for filtration has a given porosity gradient and is covered with agglutination agents (such as lectins, for example), which lead to the formation of red blood cell agglutinates. In this solution, the amount of plasma extracted varies in accordance with the haematocrit value (it diminishes when the haematocrit increases).

Document US2018/275058A1 describes a solution that makes it possible to obtain a calibrated volume.

Documents US2018/200677A1 and EP2492682A1 describe solutions for separating out blood plasma.

There is currently no solution that makes it possible to prepare a calibrated volume of plasma from a blood sample that is:

simple to use, dispensing with the use of a pipette and allowing, in particular, easy adaptation of the calibrated volume to be obtained as a function of the application,
reliable, with a view to obtaining a calibrated volume of plasma guaranteed to be free of air bubbles,
usable under different conditions, particularly directly in the field and without employing specific equipment such as a centrifuge.

PRESENTATION OF THE INVENTION

This object is achieved by a device for preparing a calibrated volume of blood plasma from a blood sample, which comprises:

a card comprising a fluidic network,
a plurality of modules arranged on the card, comprising a fluidic connection module, a module for separation of the blood plasma contained in said blood sample and a module for obtaining a calibrated volume of blood plasma obtained after separation,
said fluidic connection module, comprising:
at least one fluidic connection member which is adapted to connect a device for taking a blood sample and which comprises a first fluidic inlet of said fluidic network via which the blood sample taken is introduced,
a first fluidic outlet of said fluidic network connected to said first fluidic inlet,
means for releasing the blood sample via said first fluidic inlet,
said module for separation of the blood plasma contained in said blood sample, comprising:
a chamber formed in the card,
a separation membrane separating said chamber into a first space and a second space,
at least a second fluidic inlet of said fluidic network connected to said first fluidic outlet of the connection module and opening out into the first space of the chamber,
a second fluidic outlet of said fluidic network opening out into said second space of the chamber,
said module for obtaining a calibrated volume of blood plasma obtained after separation, comprising:
at least one fluidic pumping assembly comprising at least one pump, a first fluidic link connecting said second fluidic outlet via a first fluidic valve of said fluidic network to the pumping assembly, a first collection reservoir provided with a first vent and connected to the pumping assembly via a second fluidic link commanded by a second fluidic valve of the network, a second collection reservoir provided with a second vent and connected to the pumping assembly via a third fluidic link commanded by a third fluidic valve of the network, said at least one pump comprising a cavity that has a volume that corresponds to a unit volume of the calibrated volume to be obtained in the second collection reservoir.

According to one particular feature, said connection member comprises a first needle having a first internal channel between said first fluidic inlet and said first fluidic outlet and a blunt free end.

According to another particular feature, the means for releasing the blood sample operate via gravity and comprise a second needle having a blunt free end and a second internal channel connected to a first opening formed on the card, a second opening formed on the card being connected to said first internal channel of said first needle.

According to another particular feature, the said first opening and said second opening are each covered with a hydrophobic filter.

According to a particular embodiment, the pumping assembly comprises a single pump and the first collection reservoir and the second collection reservoir are connected in parallel to said pump respectively via the second fluidic link and via the third fluidic link.

According to a particular feature, the pump comprises a deformable membrane separating its cavity in a leaktight manner into a first volume designed to be connected to a pneumatic command point and a second volume into which one or more of said fluidic links open out.

According to another particular embodiment, the pumping assembly comprises two pumps, a first pump connected via the first fluidic link to the second fluidic outlet and to the first collection reservoir via the second fluidic link and a second pump connected via a fourth fluidic link, via a fourth fluidic valve, to the first collection reservoir and to the second collection reservoir via the third fluidic link.

According to this other particular embodiment, the module for obtaining a calibrated volume of blood plasma comprises a fifth fluidic link directly connecting said first pump to said second collection reservoir and commanded by a fifth fluidic valve.

According to another particular feature, each pump comprises a cavity formed in the card and a deformable membrane separating said cavity in a leaktight manner into a first volume designed to be connected to a pneumatic command point and a second volume into which one or more of said fluidic links open out.

According to another particular feature, the cavity of said single pump has a volume that corresponds to a unit volume of the calibrated volume to be obtained in the second collection reservoir.

According to another particular feature, the chamber of the module for separation of the blood plasma comprises a dead volume arranged between said separation membrane and at least one wall of the second space of the chamber.

According to another particular feature, the card comprises a cavity arranged under said separation membrane and arranged between the first fluidic outlet and the second fluidic inlet.

According to another particular feature, the second collection reservoir comprises a plurality of fluidic chambers arranged in parallel.

The invention also relates to a system for preparing a calibrated volume of blood plasma, said system comprising:
  a device for preparing a calibrated volume of blood plasma as defined above,
  pneumatic actuation system comprising at least one pneumatic command point connected to the pumping assembly and a plurality of pneumatic command points each connected to a distinct fluidic valve of the fluidic network,
  a treatment and command unit of said pneumatic actuation system, configured such as to execute a command sequence adapted to obtain a calibrated volume of blood plasma.

According to a particular feature, the system comprises a pump connected to said device and connected to the said first fluidic inlet to aspirate the blood sample into said device.

The invention also relates to a command method implemented in a command unit such as to obtain a sample of calibrated volume of blood plasma from a blood sample in a sampling device connected to the preparation device of the system as defined above, said method comprising a command sequence having the following steps:
  a) commanding the opening of the first fluidic valve, the closing of the second fluidic valve and the closing of the third fluidic valve,
  b) commanding the pumping assembly for aspiration of said blood sample through said separation membrane,
  c) commanding the closing of the first fluidic valve and the opening of the second fluidic valve,
  d) commanding the pumping assembly for at least partial filling of said first collection reservoir,
  e) implementing steps a) to d) up to at least partial filling of the first collection reservoir,
  f) commanding the opening of the second fluidic valve and the closing of the third fluidic valve,
  g) commanding the pumping assembly for aspiration of said blood plasma contained in the first collection reservoir,
  h) commanding the closure of the second fluidic valve and the opening of the third fluidic valve,
  i) commanding the pumping assembly for filling the second collection reservoir, and
  j) implementing steps f) to i) up to obtaining the desired calibrated volume in the second collection reservoir.

BRIEF DESCRIPTION OF THE FIGURES

Other features and advantages will become apparent in the following detailed description given with reference to the appended drawings, in which.

DETAILED DESCRIPTION OF AT LEAST ONE EMBODIMENT

Figure 1:
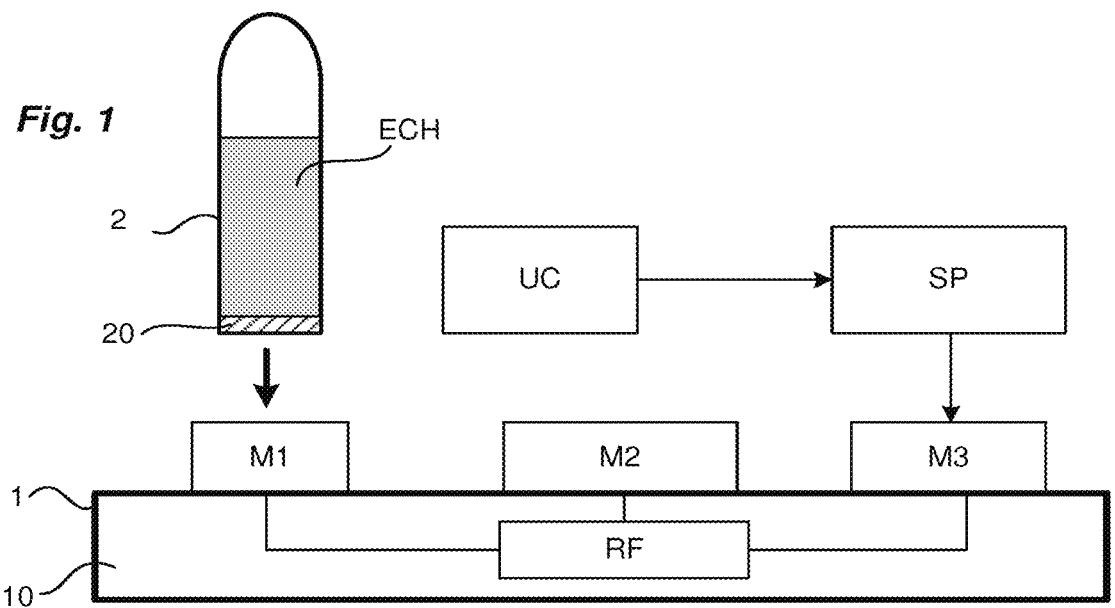
FIG. 1 schematically shows the preparation system according to the invention.

In the remainder of the description, the terms:

"top", "bottom", "below", "above", "upper", "lower", or equivalent terms, should be considered in a non-limiting manner in accordance with a vertical axis (X) that can be seen in the drawings;

"upstream" and "downstream" should be considered in the direction of movement of the fluid in the system.

With reference to FIG. 1, the system for preparing a calibrated volume of blood plasma comprises a plurality of parts:

a device 1 for preparing the calibrated volume of blood plasma, in the form of a single card 10;

a pneumatic-type actuating system SP that makes it possible to actuate pneumatic command elements present on the card;

a treatment and command unit UC configured such as to execute a command sequence of different pneumatic command points of the pneumatic actuation system with a view to obtaining, from a taken blood sample, the calibrated volume of blood plasma; this treatment and command unit may comprise a microcontroller and inlets/outlets connected to the pneumatic actuation system.

Generally speaking, the card 10 of the device comprises, notably, a fluidic network RF, or even a microfluidic network, that may comprise reservoirs, fluidic channels, valves and one or more pumps. The card may also comprise a plurality of pneumatic command points each designed for the pneumatic command of an element of the fluidic network of the card. A pneumatic command point comprises an inlet and a pneumatic channel via which it is possible to apply an air pressure or a reduced air pressure.

The device 1 advantageously comprises three distinct modules:

a fluidic connection module M1 onto which a blood sampling device may be connected;

a module M2 for separation of the blood plasma contained in the blood sample;

a module M3 for obtaining at least one calibrated volume of blood plasma after separation.

According to a particular aspect of the invention, these three modules are advantageously formed on the same card 10 and are interconnected via the fluidic network RF of the card.

The card 10 will be deemed to have an upper face, a lower face and a thickness forming its edge face. The card may be produced by assembling a plurality of substrates and the fluidic network is advantageously created by etching or moulding on one or more substrates of the card. This type of card 10 is well known and therefore its production is not described in the present application.

With reference to FIG. 1, the fluidic connection module M1 allows a direct connection of a blood sampling device, such as, for example, the tube 2 used when taking blood from the patient, designed to contain a blood sample ECH of whole blood. This tube 2 may be plugged by a septum 20.

This module M1 may comprise at least a first needle 100 protruding from the upper face of the card 10. The first needle 100 comprises an internal channel arranged between a fluidic inlet and a fluidic outlet, and a blunt free end 101 for perforating the septum 20 of the sampling tube 2. The fluidic outlet thereof is connected to a cavity 103 via a fluidic channel 102 of the network RF of the card. The module M1 thus comprises a sampling fluidic circuit comprising the channel of the needle, the channel 102 and the cavity 103 formed in the card.

The tube 2 is connected to this module M1 by piercing the septum 20 using the end 101 of the needle 100. A leaktight link makes it possible to prevent leaks of liquid around the connection.

Different solutions may be envisaged for release of the blood sample ECH in the tube 2. Three examples are given below.

Figure 2A:
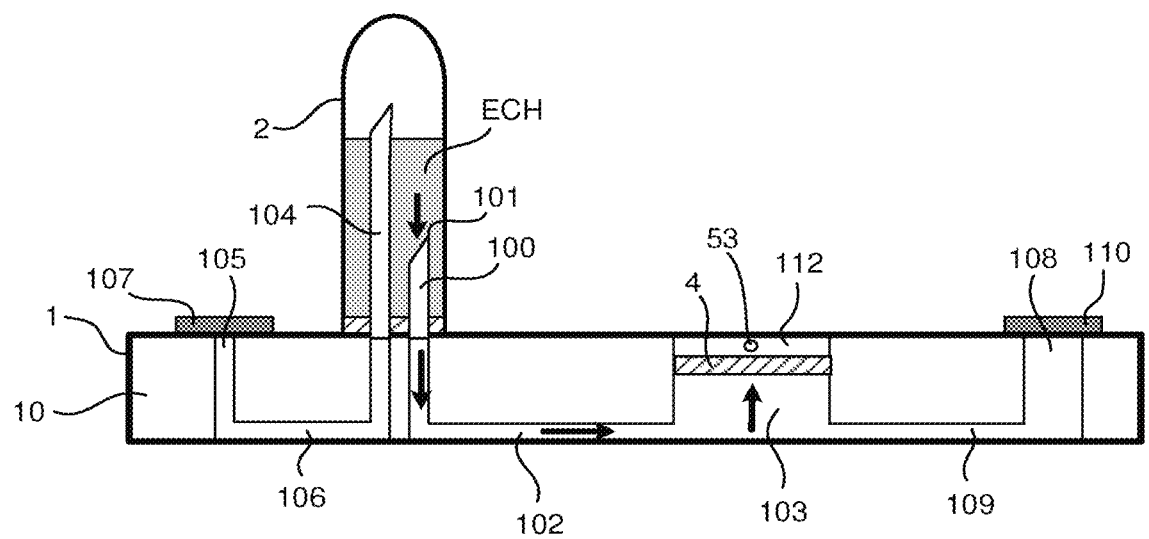
FIGS. 2A to 2C show, in section, the card of the preparation device of the invention in different variant embodiments.

By gravity—FIG. 2A: In this case, the module M1 further comprises a second needle 104, of the same type as the first needle, i.e. with an internal channel and a blunt free end for perforating the septum affixed to the tube. Its channel is connected to a first vent 105 formed on the card via a fluidic channel 106 of the network RF of the card. This first vent may be covered with a hydrophobic filter 107. To allow the release of the fluid in the tube, the cavity 103 is connected to a second vent 108 via a channel 109 of the network RF. This second vent 108 may likewise be covered with a hydrophobic filter 110. It may be noted that each hydrophobic filter in the device allows gases (for example: air, nitrogen, water vapour, etc.), but not liquids, to pass. Upon connection of the tube to the module, the septum 20 is perforated by the needles to allow the blood to flow under gravity into the cavity of the sampling fluidic circuit. The length of the second needle 104 will be chosen to be greater than that of the first needle 100 and is adapted such as to remain in contact with the air in the tube, above the level of the sampled blood in the tube.

Figure 2B:
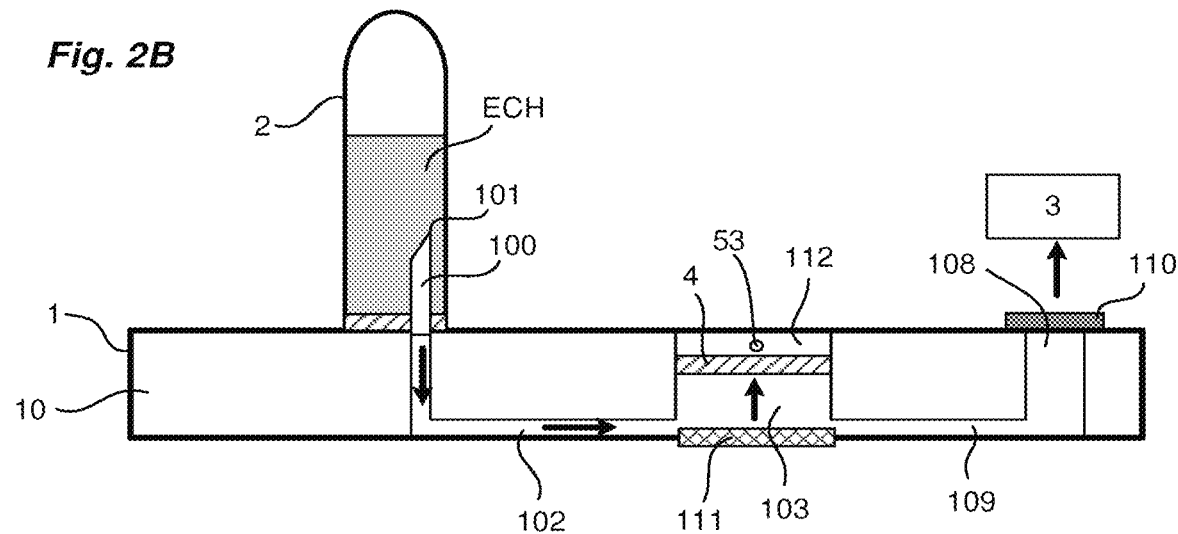

By aspiration—FIG. 2B: In this configuration, the module M1 may have an architecture with a single needle 100 perforating the septum 20. A pump 3 is connected to the second vent 108 referenced above, via the hydrophobic filter 110. The hydrophobic filter 110 blocks the blood and ensures complete filling of the cavity 103 with no constraint on the period of application of the reduced pressure. Advantageously, the air vacuum applied by the pump 3 may be absorbed in different ways, for example by using a deformable tube or by integrating a deformable membrane 111 into the sampling fluidic circuit of the module. This membrane 111 is stretched over a face of the card 10 such as at least partially to cover the cavity 103 formed in the card. Upon aspiration generated by the pump 3, the membrane 111 will thus be caused to deform in order to compensate for the aspiration phenomenon. However, as the volume to be aspirated is small, it would also be possible to omit these solutions for compensating for the air vacuum generated by the pump 3 upon aspiration.

Figure 2C:
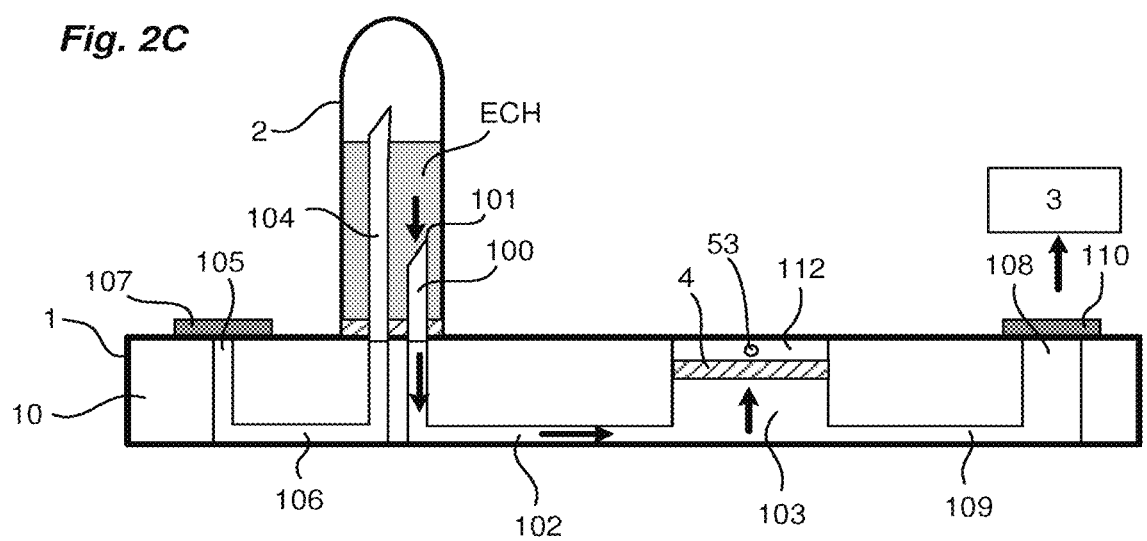

By gravity and aspiration—FIG. 2C: This architecture corresponds to that of FIG. 2A, to which the pump 3 of the architecture of FIG. 2B is added, thereby allowing supplementary release under gravity. Actuation of the pump 3 makes it possible to aspirate the sample into the fluidic network RF, as described previously.

The module M2 for separating out the blood plasma preferably comprises a separation membrane 4 acting as filter (shown in FIGS. 2A to 2C). This membrane is housed in the card 10 such as to separate a chamber into two distinct spaces. A first space, upstream, may correspond to the cavity 103 of the sampling fluidic circuit containing the blood taken by the first module M1, and a second space 112, downstream, designed such as to receive a volume of plasma obtained after filtration by the membrane 4. According to a particular configuration, the cavity is located under the membrane 4 and the second space is located above the membrane 4.

In a known manner, the separation membrane 4 is specifically designed for the generation of plasma from whole blood. The nature of the membrane allows the blood cell components (red blood cells, white blood cells and platelets) to be captured in the large pores of the membrane, without lysis, whereas the plasma flows into the smaller pores downstream of the membrane. This type of membrane is well known and is not described in detail in the present application. It may be a membrane such as that described in patent application US2014/0263059A1.

It should be noted that in order to pass through the membrane 4 it is necessary for the blood sample in the cavity 103 to be aspirated. This aspiration is performed by employing a pump of the module M3 for obtaining the calibrated volume of plasma, the architecture and the operating principle of which are described below.

The module M3 for obtaining the calibrated volume of plasma in effect uses a fluidic-type pump, with pneumatic actuation.

Figure 3:
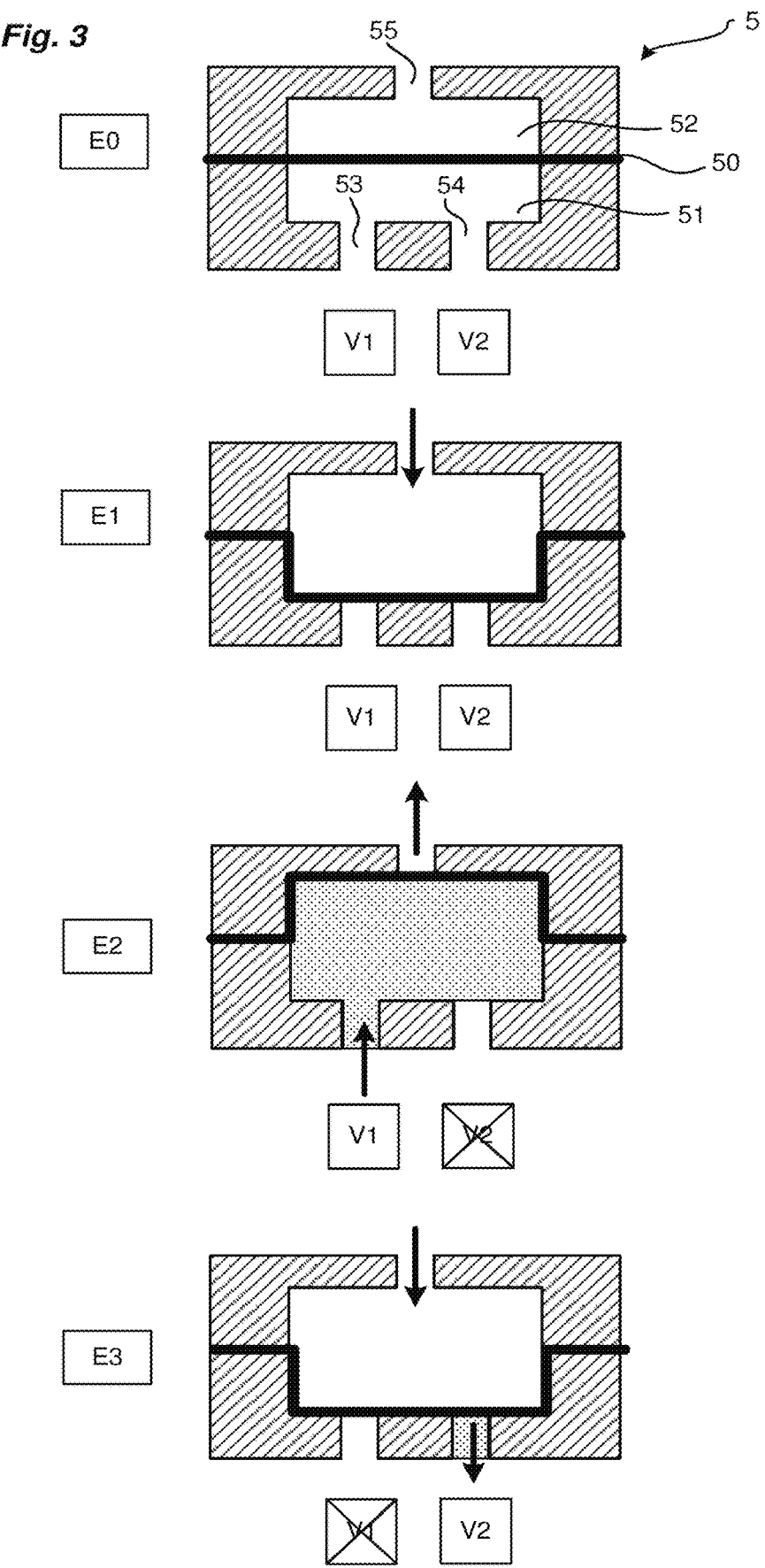
FIG. 3 illustrates the operating principle of a pump employed in the device of the invention.

This type of pump 5, shown in FIG. 3 (E0—non-actuated state), comprises a deformable membrane 50 arranged in a cavity of the card and separating the cavity into two volumes 51, 52 that are leaktight relative to one another. The first volume 51 designed to pump the plasma obtained after separation and the second volume 52 allows pneumatic actuation of the membrane.

At least two fluidic links 53, 54 of the network open out into the first volume 51 and a pneumatic link 55 opens out into the second volume 52.

The first fluidic link 53 is commanded by a first fluidic valve V1 that can be commanded to open or to close by the pneumatic actuation system SP.

The second fluidic link 54 is commanded by a second fluidic valve V2 that can be commanded to open or to close by the pneumatic actuation system SP.

Naturally, in the solution of the invention, the two fluidic valves may be of normally closed or normally open type, of monostable or bistable type. It will also be seen that the pump may be connected to more than two commanded fluidic links, depending on the envisaged configuration.

With reference to FIG. 3, the operating principle of such a pump 5 is as follows:
  E1: a pressure is applied in the second volume of the pump such as to press the membrane 50 against the bottom of the cavity and to initiate the aspiration principle; the valve V2 is then open and the valve V1 may be open or closed;
  the first fluidic valve V1 is commanded to open and the second fluidic valve V2 is commanded to close;
  E2: a reduced pressure is applied in the second volume 52 such as to cause the membrane 50 to rise, generating an aspiration of the fluid by the first fluidic link 53 into the first volume 51 of the cavity. The reduced pressure is advantageously applied until the membrane 50 is pressed against the top of the cavity and the first volume 51 is completely filled (which volume thus corresponds to the full volume of the cavity of the pump);
  the first fluidic valve V1 is commanded to close and the second fluidic valve V2 is commanded to open; and
  E3: a pressure is applied to the membrane 50 to push the fluid in the first volume 51 via the second fluidic link 54 until the membrane 50 is pressed against the bottom of the cavity and all the fluid outside the pump 5 is evacuated.

This operating principle of the pump 5 is applied to the device of the invention, particularly to its module M3 for obtaining a calibrated volume of plasma.

The module M3 for obtaining a calibrated volume of plasma in effect comprises a pumping assembly EP that may include at least one pump such as that described above in connection with FIG. 3. Two embodiments are presented below, a first embodiment having a single pump 5 and a second embodiment having two pumps 5A, 5B.

In both embodiments, the first fluidic link 53 mentioned above is in communication with the second space 112 of said chamber via the first fluidic valve V1 that can be commanded to open or to close by the pneumatic actuation system SP, such as to allow the aspiration of the plasma in the module M3. The second fluidic link 54, meanwhile, is in communication with a first collection reservoir R1 of the calibration module M3 via the second fluidic valve V2 that can be commanded to open or to close by the pneumatic actuation system SP.

Furthermore, the module M3 also comprises a second collection reservoir R2.

The fluidic architecture of the module M3 is formed on the card 10.

Each of the two embodiments comprises at least one pump, the volume of which (corresponding to the maximum volume of blood that it is able to aspirate into its cavity) corresponds to the base unit of the calibrated volume to be obtained. Indeed, as it is possible to carry out one or more pumping cycles, it is possible to obtain in the second collection reservoir R2 defined above, a volume equal to that of this pump, multiplied by the number of pumping cycles carried out.

Figure 4:
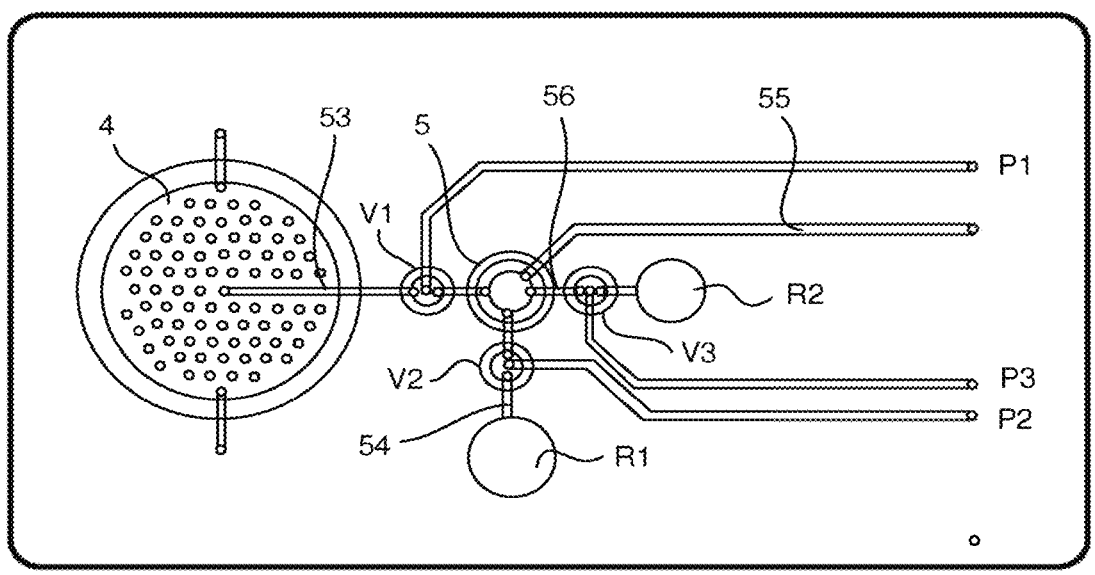
FIG. 4 shows, in plan view, a particular embodiment of the microfluidic card employed in the preparation device according to the invention.
Figure 5A:
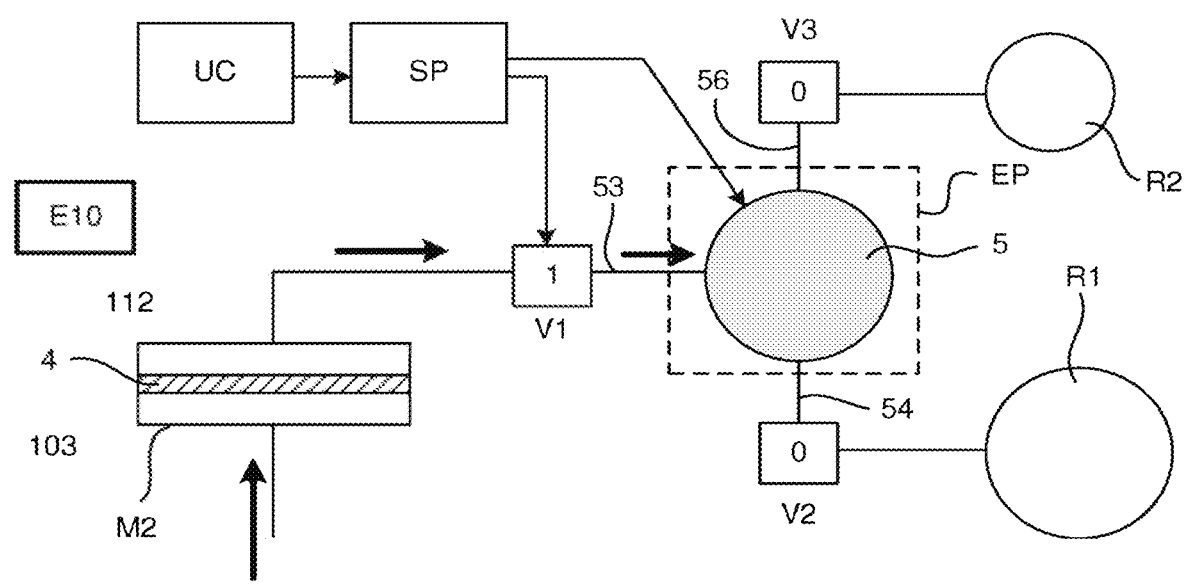
FIGS. 5A-5D show the various steps in the method for preparing a calibrated volume of blood plasma.
Figure 5B:
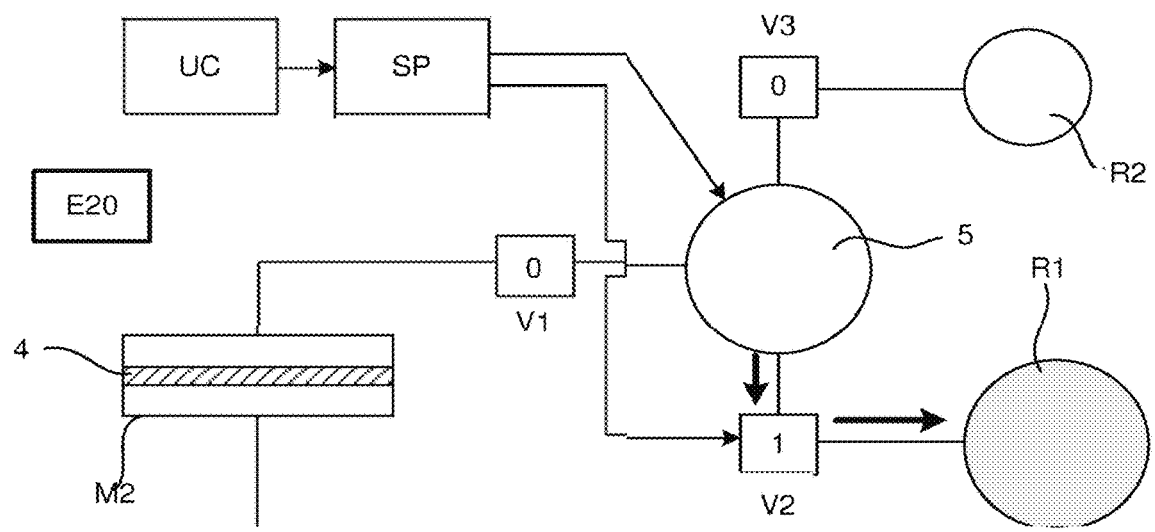
Figure 5C:
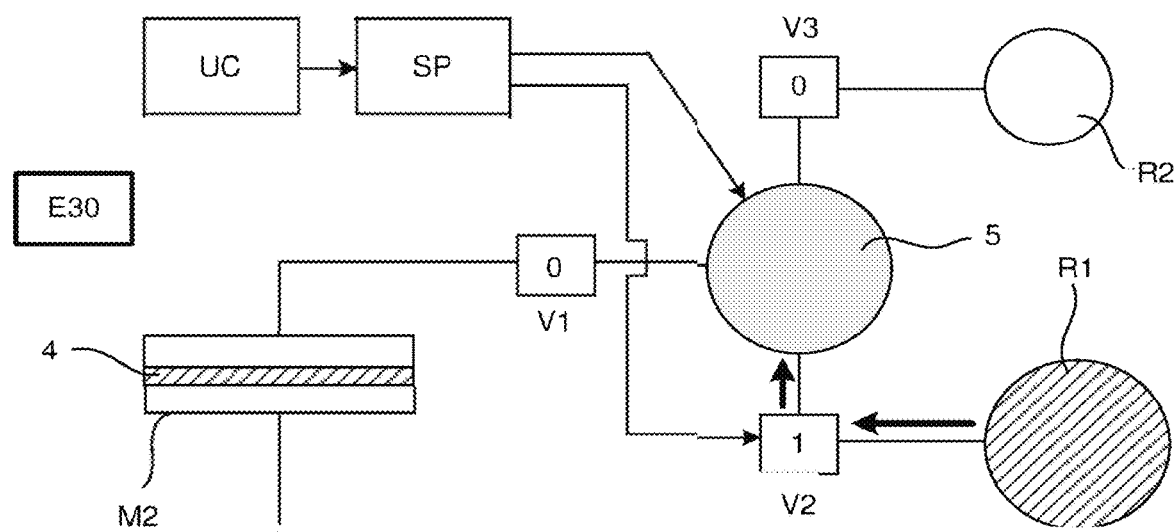
Figure 5D:
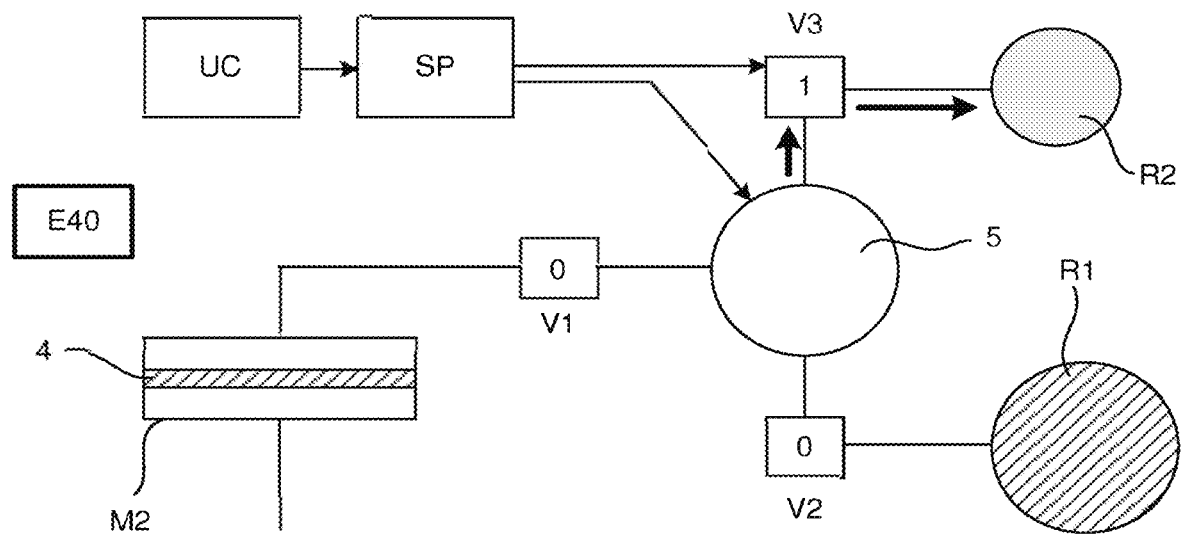

The fluidic architecture of an embodiment with a single pump is represented in FIG. 4.

In this FIG. 4, the following have thus been shown:
  the separation membrane 4;
  the pump 5;
  the fluidic link 53 connecting solely the first volume 51 of the pump 5 to the second space 112 of the chamber;
  the first fluidic valve V1 that can be commanded to open or to close via a pneumatic command point P1;
  the first collection reservoir R1;
  the second fluidic link 54 connecting solely the first volume 51 of the pump 5 to the first collection reservoir R1;
  the second fluidic valve V2 that can be commanded to open or to close via a pneumatic command point P2;
  the second collection reservoir R2;
  a third fluidic link 56 connecting solely the first volume 51 of the pump to the second collection reservoir R2;
  a third fluidic valve V3 that can be commanded to open or to close via a pneumatic command point P3, this valve V3 being arranged on the third fluidic link 56.

Each collection reservoir R1, R2 may have any form and any volume. Naturally, both will advantageously have a volume greater than or equal to the volume of the cavity of the pump 5. It may, in particular, be a case of a simple fluidic channel, the (constant or non-constant) section and the length of which define the volume of the reservoir.

In the first embodiment, the pump 5 is thus connected to the two reservoirs in parallel, via two distinct fluidic links that can each be commanded to open or to close.

In the embodiment with a single pump 5, the volume of the pump, which corresponds to the maximum volume of blood that it is able to aspirate into its cavity, corresponds to the base unit of the calibrated volume to be obtained. Indeed, as one or more pumping cycles may be carried out, it is possible to obtain in the second collection reservoir R2 defined above, a volume equal to that of the pump, multiplied by the number of pumping cycles carried out.

Starting from this first architecture, with reference to FIGS. 5A-5D, a calibrated volume of blood plasma is obtained as explained below. In FIGS. 5A-5D, the 0 status of a valve corresponds to its closed state, i.e. it does not allow the fluid to flow in the fluidic link that it commands, and the 1 status of a valve corresponds to its open state, i.e. it allows the fluid to flow in the fluidic link that it commands.

Initially, the first fluidic valve V1 is open and the second fluidic valve V2 and the third fluidic valve V3 are closed;

E10: the pump 5 is actuated as explained above such as to aspirate plasma into its first volume 51. The aspiration generated allows the sampled blood present in the cavity 103 to be entrained through the separation membrane 4 in order to separate out the blood plasma. The separated-out plasma in said second space 112 is then transferred into the first volume 51 of the pump via the first fluidic link 53. The first volume 51 of the pump is completely filled with the blood plasma and with any air bubbles;

the first fluidic valve V1 is closed. The second fluidic valve V2 is open and the third fluidic valve V3 is kept closed;

E20: the pump 5 is actuated in order to move the plasma present in its second volume 51 via the second fluidic link 54 towards the first collection reservoir R1 the pumping cycle corresponding to the preceding steps E10 to E20 may be implemented once or more than once. When the first collection reservoir R1 is filled with plasma to the desired amount, the first fluidic valve V1 is closed, the second fluidic valve V2 is open and the third fluidic valve V3 is closed;

E30: actuation of the pump 5 allows a first calibrated unit volume of plasma to be aspirated from the first collection reservoir R1 into the first volume 51 of the pump via the second fluidic link 54;

the first fluidic valve V1 remains closed, the second fluidic valve V2 is closed and the third fluidic valve V3 is open;

E40: the pump 5 is actuated such as to move the calibrated unit volume of plasma taken in its first volume 51 towards the second collection reservoir R2 via the third fluidic link 56; and the pumping cycle of steps E30 to E40 may be implemented until the total required calibrated volume has been obtained. The number of pumping cycles is applied as a function of the total calibrated volume to be obtained. The volume of plasma in the first collection reservoir R1 may be at least equal to the calibrated volume of plasma to be obtained in the second collection reservoir R2.

According to a particular feature of this embodiment, the volume of the cavity of the pump 5 may be chosen to be small so as to allow a range of volumes with good resolution. For example, it is possible for there to be a 5 µL pump that will be actuated once or more than once such as to obtain calibrated volumes of plasma ranging from 5 µL, 10 µL, 15 µL, 20 µL and so on.

Figure 6:
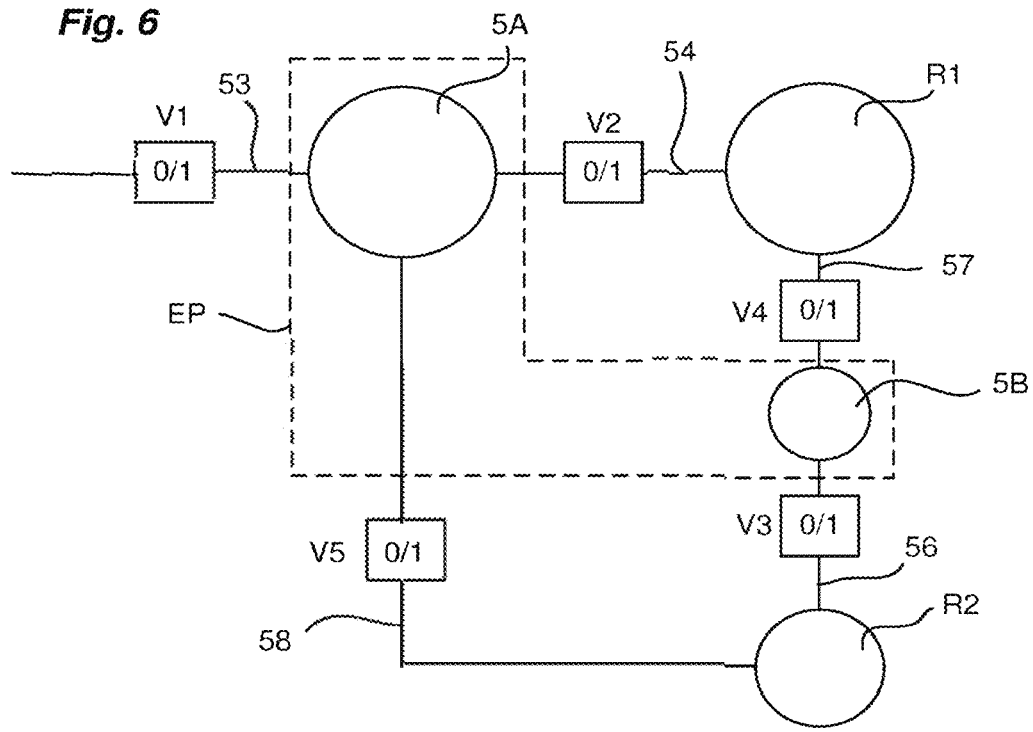
FIG. 6 shows a variant embodiment of the fluidic network employed in the device of the invention.

In the second embodiment, shown in FIG. 6, the pumping assembly EP of the module for obtaining the calibrated volume may comprise two pumps 5A, 5B.

The first pump 5A is used to recover the plasma from the separation module M2 and to direct it towards the first collection reservoir R1 or directly towards the second collection reservoir R2. This first pump 5A may have a large capacity (for example, 50 µL, 100 µL, etc.), with a view to allowing the number of actuations to be limited. The second pump 5B has a smaller volume (for example, 5 µL, 10 µL, 25 µL, etc.), and is used to take up the plasma from the first collection reservoir R1 in order to transfer it towards the second collection reservoir R2 corresponding to the calibrated volume. In this embodiment, as illustrated in FIG. 6, the first pump 5A, the first collection reservoir R1, the second pump 5B and the second collection reservoir R2 are thus connected in series in the following manner:

first fluidic link 53,
first fluidic valve V1 controlling the first fluidic link,
first pump 5A,
first collection reservoir R1,
second fluidic link 54,
second fluidic valve V2 controlling the second fluidic link,
new fluidic link, called the "fourth fluidic link" 57,
new fluidic valve V4 controlling the fourth fluidic link 57,
second pump 5B,
third fluidic link 56,
third fluidic valve V3 controlling the third fluidic link 56.

Furthermore, in addition to this configuration in series, a fifth fluidic link 58 thus directly connects the first pump 5A to the second collection reservoir R2 via a fifth fluidic valve V5.

The second embodiment operates as follows. The first pump 5A allows the plasma separated in the module M2 to be aspirated towards the first collection reservoir R1 via the fluidic link 54 or directly towards the second collection reservoir R2 via the fluidic link 58. One or more pumping cycles of the first pump 5A may be carried out, depending on the amount of plasma to be transferred. As the first pump 5A may be chosen to have a volume greater than that of the second pump 5B, it may thus be used to directly transfer a greater volume of plasma towards the second collection reservoir R2 via the fluidic link 58. Then, with a view to tailoring the calibrated volume to be obtained, a quantity of plasma is transferred from the first collection reservoir R1 towards the second collection reservoir R2 using the second pump 5B. The calibrated volume to be obtained may thus be determined on the basis of the number of pumping cycles applied to the first pump 5A directly towards the second collection reservoir R2, then by the number of pumping cycles applied to the second pump 5B of the first collection reservoir R1 towards the second collection reservoir R2. It may be noted that it is also possible to use the first pump 5A to transfer a volume of plasma into the first collection reservoir R1 and then, using the second pump 5B, to transfer plasma until the calibrated volume has been obtained.

In the first architecture and the second architecture, the blood plasma is always recovered in two stages and asynchronously. This solution makes it possible, in particular, to eliminate the air bubbles. Intermediate storage of a volume of plasma in the first collection reservoir R1 in effect makes it possible to eliminate the air bubbles in this reservoir prior to transfer towards the second collection reservoir R2. Indeed, at the time of the first pumping towards the first collection reservoir R1, the air bubbles are evacuated and the second pumping towards the second collection reservoir R2 with a calibrated volume enables plasma to be recovered without air bubbles.

According to a particular embodiment, the second collection reservoir R2 may be replaced by an array of several chambers connected in parallel to one and the same distribution channel. This chamber may house a different reagent allowing in fine the metering of a particular analyte into each chamber.

According to a particular feature, the two collection reservoirs R1, R2 may be open to the ambient air, be provided with a vent or be covered with a deformable membrane.

It will be understood from each embodiment described above that filtration through the separation membrane 4 takes place from the bottom towards the top (when the device is arranged on a planar support), i.e. from the cavity 103 towards the pump 5. By placing the cavity 103 under the membrane 4, the portion that is most depleted in terms of components of the sample of blood is filtered first at the time of aspiration, which makes it possible to avoid overloading the membrane from the very start of the process for separating out the plasma.

According to another particular feature, the separation module M2 may have a dead volume above the membrane with a view to better distributing the pressure over the entire membrane upon aspiration by the pump.

Advantageously, it would be possible to make provision for an analysis of the plasma directly in the second collection reservoir R2 of calibrated volume or, if they are present, in each chamber if this second reservoir R2 is replaced by a network of several chambers in parallel.

The method which makes it possible to obtain a calibrated final volume in the second collection reservoir R2 is carried out in accordance with a suitable command sequence, in particular by sending successive command orders to the pneumatic actuation system.

The command sequence is executed by the treatment and command unit UC of the system.

After activation of the preparation system, and in a non-limiting manner considering the fluidic valves to be of the normally closed type, in order to obtain a calibrated volume, the sequence executed by the treatment and command unit UC on an architecture provided with a pumping assembly EP with a single pump 5 may comprise the following steps:
- generation of a command and issuing of the command to an external pump 3 (if release is achieved by aspiration) such as to aspirate the blood sample outside the tube 2 after having connected same to the connection module M1; this command is optional if release is achieved solely under gravity;
- generation of a command destined for the pneumatic actuation system SP in order to command the first fluidic valve V1 to open;
- generation of a command and issuing of the command towards the pneumatic actuation system SP in order to command the pump 5 with a view to aspirating the blood sample ECH through the separation membrane in order to recover the blood plasma in the first volume 51 of the pump 5;
- generation of a command destined for the pneumatic actuation system SP in order to command the second fluidic valve V2 to open;
- generation of a command and issuing of the command towards the pneumatic actuation system SP in order to command the pump 5 with a view to injecting the blood plasma in the volume of the pump 5 towards the first collection reservoir R1;
- the command unit UC may determine the number of pumping cycles necessary to sufficiently fill the first collection reservoir;
- once the first collection reservoir R1 has been filled at least partially with blood plasma (possibly obtained after a plurality of pumping cycles), generation of a command destined for the pneumatic actuation system SP in order to command the second fluidic valve V2 to open;
- generation of a command and issuing of the command towards the pneumatic actuation system SP in order to command the pump 5 with a view to aspirating the blood plasma in the first collection reservoir R1 towards the volume of the pump 5;
- generation of a command destined for the pneumatic actuation system in order to command the third fluidic valve V3 to open;
- generation of a command and issuing of the command towards the pneumatic actuation system SP in order to command the pump 5 with a view to injecting the blood plasma in the volume of the pump towards the second collection reservoir R2;
- the command unit UC may determine the number of pumping cycles necessary for obtaining the desired calibrated volume in the second collection reservoir R2.

The command principle will be identical for a pumping assembly EP with two pumps as described above.

The solution of the invention offers numerous advantages, including:
- precise calibration of the volume of plasma, notably by virtue of the elimination of the air bubbles by means of passage via the first collection reservoir;
- the possibility of choosing the calibrated volume by adapting the number of cycles of pumping towards the second collection reservoir;
- the possibility of carrying out a plurality of analyses in parallel on the same card with different volumes of plasma in the case of a solution with a plurality of chambers in parallel;
- automatic replenishment of the blood in the cavity by means of gravity;
- precise control of pressure in order to avoid haemolysis.

The invention claimed is:

1. A device for preparing a calibrated volume of blood plasma from a blood sample, comprising:
   a card comprising a fluidic network, and
   a plurality of modules arranged on the card, comprising a fluidic connection module, a module for separation of the blood plasma contained in said blood sample and a module for obtaining a calibrated volume of blood plasma obtained after separation,
   said fluidic connection module comprising:
      at least one fluidic connection member which is adapted to connect a device for taking a blood sample and which comprises a first fluidic inlet of said fluidic network via which the blood sample taken is introduced, and
      a first fluidic outlet of said fluidic network connected to said first fluidic inlet,
   said module for separation of the blood plasma contained in said blood sample comprising:
      a chamber formed in the card,
      a separation membrane separating said chamber into a first space and a second space, at least a second fluidic inlet of said fluidic network connected to said first fluidic outlet of the connection module and opening out into the first space of the chamber, a second fluidic outlet of said fluidic network opening out into said second space of the chamber, said module for obtaining a calibrated volume of blood plasma obtained after separation comprising:

at least one fluidic pumping assembly comprising at least one pump, a first fluidic link connecting said second fluidic outlet via a first fluidic valve of said fluidic network to the pumping assembly, a first collection reservoir provided with a first vent and connected to the pumping assembly via a second fluidic link commanded by a second fluidic valve of the network, and a second collection reservoir provided with a second vent and connected to the pumping assembly via a third fluidic link commanded by a third fluidic valve of the network, said at least one pump comprising a cavity that has a volume that corresponds to a unit volume of the calibrated volume to be obtained in the second collection reservoir.

2. The device according to claim 1, wherein said connection member comprises a first needle having a first internal channel between said first fluidic inlet and said first fluidic outlet and a blunt free end.

3. The device according to claim 2, wherein the connection member comprises a second needle having a blunt free end and a second internal channel connected to a first opening formed on the card, a second opening formed on the card being connected to said first internal channel of said first needle.

4. The device according to claim 3, wherein said first opening and said second opening are each covered with a hydrophobic filter.

5. The device according to claim 1, wherein the pumping assembly comprises a single pump and wherein the first collection reservoir and the second collection reservoir are connected in parallel to the single pump respectively via the second fluidic link and via the third fluidic link.

6. The device according to claim 5, wherein the single pump comprises a deformable membrane separating the cavity in a leaktight manner into a first volume designed to be connected to a pneumatic command point and a second volume into which one or more of said fluidic links open out.

7. The device according to claim 1, wherein the pumping assembly comprises two pumps, a first pump connected via the first fluidic link to the second fluidic outlet and to the first collection reservoir via the second fluidic link and a second pump connected via a fourth fluidic link to the first collection reservoir via a fourth fluidic valve and to the second collection reservoir via the third fluidic link.

8. The device according to claim 7, wherein the module for obtaining a calibrated volume of blood plasma comprises a fifth fluidic link directly connecting said first pump to said second collection reservoir and commanded by a fifth fluidic valve.

9. The device according to claim 7, wherein each pump comprises a cavity and a deformable membrane separating the cavity thereof in a leaktight manner into a first volume designed to be connected to a pneumatic command point and a second volume into which one or more of said fluidic links open out.

10. The device according to claim 9, wherein the cavity of said second pump has a volume that corresponds to a unit volume of the calibrated volume to be obtained in the second collection reservoir.

11. The device according to claim 1, wherein the card comprises a second cavity arranged under said separation membrane and arranged between the first fluidic outlet and the second fluidic outlet.

12. The device according to claim 1, wherein the second collection reservoir comprises a plurality of fluidic chambers arranged in parallel.

13. A system for preparing a calibrated volume of blood plasma, comprising:

the device for preparing a blood sample as defined in claim 1, a pneumatic actuation system comprising at least one pneumatic command point connected to the pumping assembly and a plurality of pneumatic command points each connected to a distinct fluidic valve of the fluidic network, and a treatment and command unit of said pneumatic actuation system configured to execute a command sequence adapted to obtain a calibrated volume of blood plasma.

14. The system according to claim 13, further comprising a pump connected to said device and connected to said first fluidic inlet to aspirate the blood sample into said device.

15. A command method implemented in a command unit for obtaining a sample of calibrated volume of blood plasma from a blood sample in a sampling device connected to the device for preparing a blood sample which are included in the system defined in claim 13, said method comprising a command sequence having the following steps:

a) commanding opening of the first fluidic valve, closing of the second fluidic valve and closing of the third fluidic valve, b) commanding the pumping assembly for aspiration of said blood sample through said separation membrane, c) commanding the closing of the first fluidic valve and opening of the second fluidic valve, d) commanding the pumping assembly for at least partial filling of said first collection reservoir, e) implementing steps a) to d) up to at least partial filling of the first collection reservoir, f) commanding the opening of the second fluidic valve and the closing of the third fluidic valve, g) commanding the pumping assembly for aspiration of said blood plasma contained in the first collection reservoir, h) commanding the closing of the second fluidic valve and the opening of the third fluidic valve, i) commanding the pumping assembly for filling the second collection reservoir, and j) implementing steps f) to i) up to obtaining a desired calibrated volume in the second collection reservoir.

16. The device according to claim 3, wherein the second needle is connected to a third vent.

* * * * *